(12) United States Patent
Huang (10) Patent No.: US 9,381,778 B2
(45) Date of Patent: Jul. 5, 2016

(54) TIRE PRESSURE MONITORING SYSTEM

(71) Applicant: SUNG JUNG MINUTE INDUSTRY CO., LTD., Hsinchu County (TW)

(72) Inventor: Wen-Huo Huang, Hsinchu County (TW)

(73) Assignee: SUNG JUNG MINUTE INDUSTRY CO., LTD., Hsinchu County (TW)

( * ) Notice: Subject to any disclaimer, the term of this patent is extended or adjusted under 35 U.S.C. 154(b) by 48 days.

(21) Appl. No.: 14/483,627

(22) Filed: Sep. 11, 2014

(65) Prior Publication Data
US 2016/0075193 A1    Mar. 17, 2016

(51) Int. Cl.
*B60C 23/04* (2006.01)
*B60C 23/00* (2006.01)
*B60C 23/02* (2006.01)

(52) U.S. Cl.
CPC .................. *B60C 23/0433* (2013.01)

(58) Field of Classification Search
CPC ............ B60C 23/0433; B60C 23/0408; B60C 23/0479; B60C 23/0416; B60C 23/0462
USPC .......................................... 340/447, 442, 444
See application file for complete search history.

(56) References Cited

U.S. PATENT DOCUMENTS

| 6,005,299 | A | * | 12/1999 | Hengst | G01C 21/3664 200/519 |
|---|---|---|---|---|---|
| 2002/0014115 | A1 | * | 2/2002 | Young | B60C 23/0416 73/146 |
| 2009/0102636 | A1 | * | 4/2009 | Tranchina | B60C 23/0408 340/447 |
| 2012/0044064 | A1 | * | 2/2012 | Maekawa | B60C 23/0408 340/447 |
| 2015/0054640 | A1 | * | 2/2015 | Huang | B60C 23/0415 340/447 |
| 2015/0239307 | A1 | * | 8/2015 | Horikoshi | B60C 23/0479 340/442 |

* cited by examiner

*Primary Examiner* — Jack K Wang
(74) *Attorney, Agent, or Firm* — Muncy, Geissler, Olds & Lowe, P.C.

(57) ABSTRACT

A tire pressure monitoring system includes a plurality of tire pressure sensing modules and an information display module in information connection with the tire pressure sensing modules. The tire pressure sensing modules are installed at respective tires of a vehicle to transmit tire condition information of the respective tires and device identification codes to the information display module. The information display module includes a data processing unit associating each of the device identification codes with a device selection code and a stepless knob controlled to output at least one selection signal to the data processing unit. Upon receiving the selection signal, the data processing unit determines the corresponding device selection code according to the selection signal to read the corresponding tire condition information, thereby allowing a user to quickly learn the tire condition of any tire of the vehicle.

8 Claims, 8 Drawing Sheets

TIRE PRESSURE MONITORING SYSTEM

FIELD OF THE INVENTION

The present invention relates to a tire pressure monitoring system, and particularly to a tire pressure monitoring system that allows a driver to quickly learn a tire condition of any tire of a vehicle according to requirements of the driver.

BACKGROUND OF THE INVENTION

According to statistics, more than 70% of traffic accidents on highways are caused by punctured tires. However, only less than 10% of drivers have a habit of initiatively checking tire conditions of vehicles. As seen, abnormality issues of vehicle tires have long been a main problem that is difficult to prevent for all drivers. Therefore, it is a research and development focus as how to establish a tire pressure sensing auxiliary system for constantly monitoring tire conditions and immediately reminding drivers in events of abnormal tire conditions to further prevent accidents and casualties.

A conventional tire pressure monitory auxiliary system usually includes a plurality of tire pressure sensing modules. The tire pressure sensing modules sense respective tire conditions of a vehicle, and immediately remind a user through a beeper or an alarm light when the tire conditions of the vehicle are sensed abnormal. However, a conventional tire pressure monitoring system is incapable of quickly feeding a user with tire condition information of any tire.

SUMMARY OF THE INVENTION

A primary object of the present invention is to allow a driver to quickly learn a tire condition of any tire of a vehicle.

A secondary object of the present invention is provide tire pressure simulation graphic data that simulates a tire pressure change of one of the tires of a vehicle within a monitoring period, so as to allow a driver to quickly learn a time point liable to an abnormality in the tire pressure according to the tire pressure simulation graphic data.

To achieve the above object, a tire pressure monitoring system is provided. The tire pressure monitoring system includes a plurality of tire pressure sensing modules and an information display module. The tire pressure sensing modules are respectively installed on tires of a vehicle and each has a device identification code. Each of the tire pressure modules includes a detection unit and a first data transmission unit. The detection unit constantly detects a tire condition of the tire and outputs tire condition information. The first data transmission unit, in information connection with the detection unit, transmits the tire condition information and the device identification code. The information display module, in information connection with the tire pressure sensing modules, includes a second data transmission unit, a data processing unit, a display unit, and a stepless knob. The second data transmission unit is connected to the first data transmission units to receive the device identification codes and the tire condition information of the tire pressure sensing modules. The data processing unit obtains the device identification codes and the tire condition information from the second data transmission unit, and associates each of the device identification codes with a device selection code. The display unit, in information connection with the data processing unit, displays the tire condition information obtained from the data processing unit. The stepless knob, in information connection with the data processing unit, outputs at least one selection signal to the data processing unit by a control means. The selection signal is associated with the device selection code. When the data processing unit receives the selection signal, the corresponding tire condition information of the corresponding device selection code is read and outputted to the display unit for data display.

In one embodiment, the information display module further includes a data storage unit. The data storage unit, in information connection with the data processing unit, stores the device identification codes and the tire condition information.

In one embodiment, the information display module further includes a setting member. The setting member, connected to the data processing unit, is configured to enter a task mode preset in the data processing unit when triggered by a user.

In one embodiment, the task mode is an abnormality warning mode. In the abnormality warning mode, the data processing unit has an abnormal condition preset in the data processing unit, and compares the tire condition information with the abnormal condition, and outputs a warning signal to the display unit for display when the tire condition information satisfies the abnormal condition.

In one embodiment, the task mode is an abnormal condition setting mode. In the abnormal condition setting mode, the data processing unit receives the selection signal outputted from the stepless knob to determine the abnormal condition as a comparison reference value for comparing with the tire condition information.

In one embodiment, the task mode is a data graphicalization mode. In the data graphicalization mode, the data processing mode processes one set of the tire condition information corresponding to one of the device identification codes within a monitoring period to convert the tire condition information to tire pressure simulation graphic data that is displayed at the display unit.

In one embodiment, the task mode is a tire condition polling mode. In the tire condition polling mode, the data processing unit sequentially reads the tire condition information respectively corresponding to the device selection codes at a time interval, and outputs the tire condition information to the display unit for display.

In one embodiment, the task mode is a tire pressure sensing module matching mode. In the tire pressure sensing module matching mode, the data processing unit prompts the second data transmission unit to search any device identification code detectable within a connection distance, and determines whether the detected device identification code has been previously obtained. If not, the tire pressure sensing module corresponding to the detected device identification code is connected according to the detected device identification code and the current selection signal generated by the stepless knob.

With the above structure disclosed by the present invention, the present invention has following features compared to a conventional solution.

First of all, a stepless knob is provided by the present invention. The stepless knob can be operated by a control means to generate at least selection signal. The data processing unit receives the selection signal, analyzes the corresponding device identification code, and reads the tire condition information generated by the corresponding tire pressure sensing module to display the tire condition information at the display unit. Thus, a driver is allowed to quickly learn the condition of any tire of the vehicle according to requirements.

Secondly, in the present invention, a data graphicalization mode is preset in the information display module. In the data graphicalization mode, a tire pressure change of a selected tire within a monitoring period may be presented at the display unit to allow a driver to observe a time point liable to an abnormality in the tire pressure during a driving process.

DETAILED DESCRIPTION OF THE PREFERRED EMBODIMENTS

Details and technical contents of the present invention are given in the following description, which proceeds with reference to the accompanying drawings.

Figure 1:
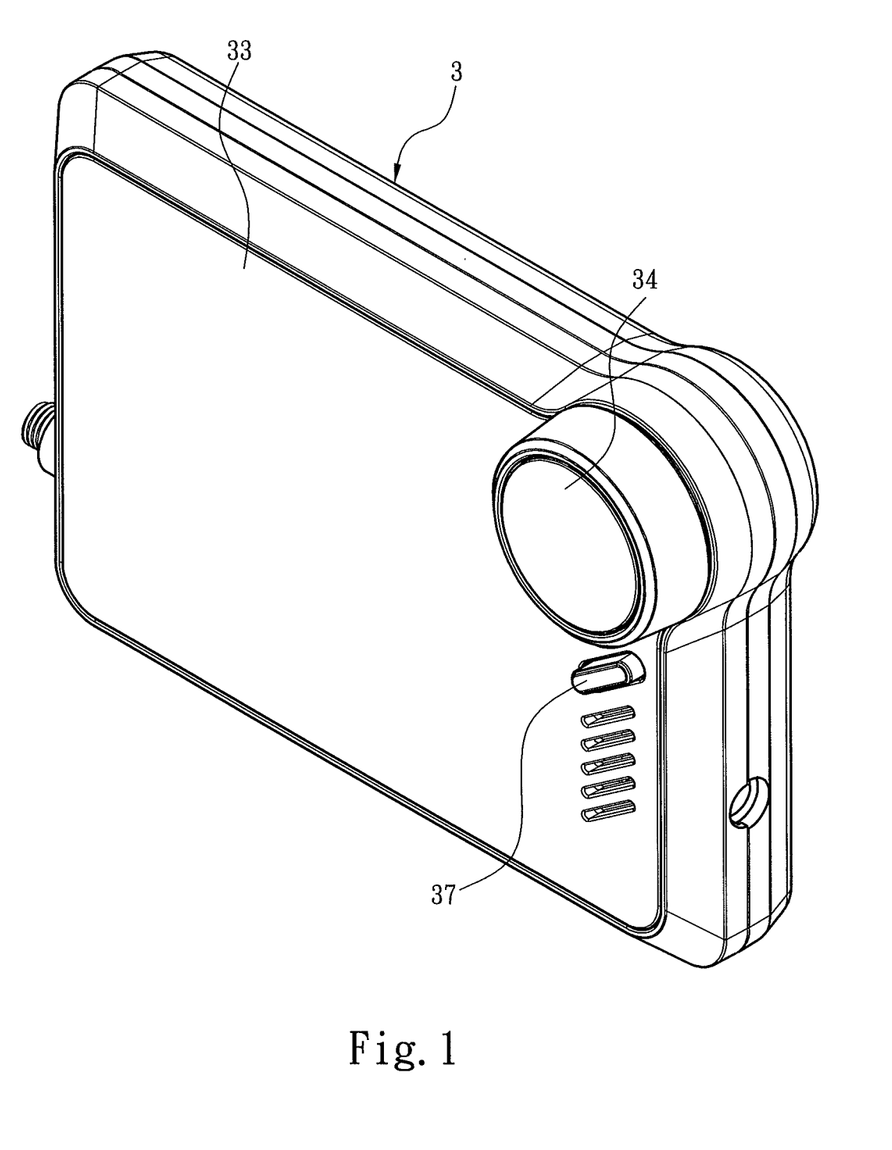
FIG. 1 is a diagram of an appearance of an information display module according to an embodiment of the present invention.
Figure 2:
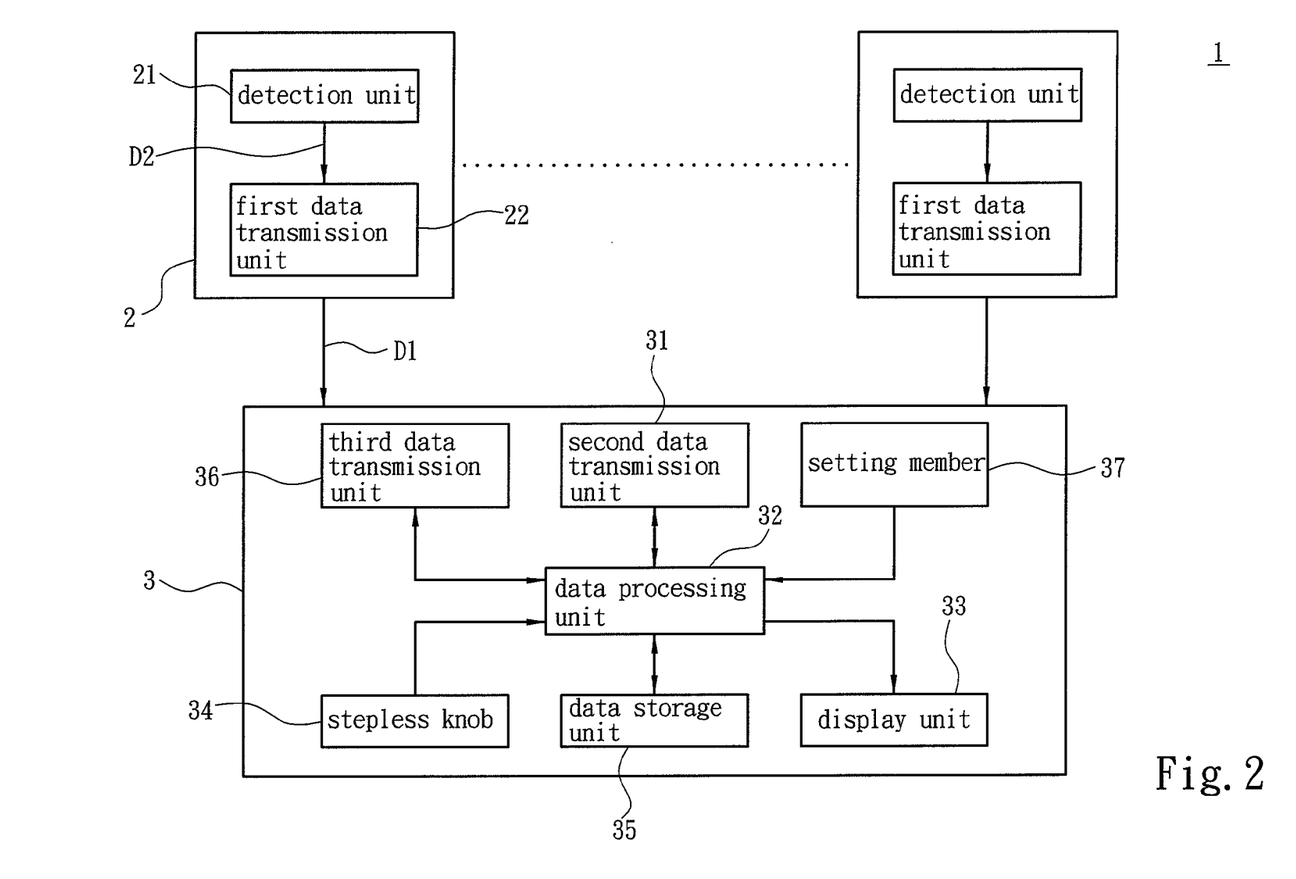
FIG. 2 is a block diagram of a tire pressure monitoring system according to an embodiment of the present invention.
Figure 3A:
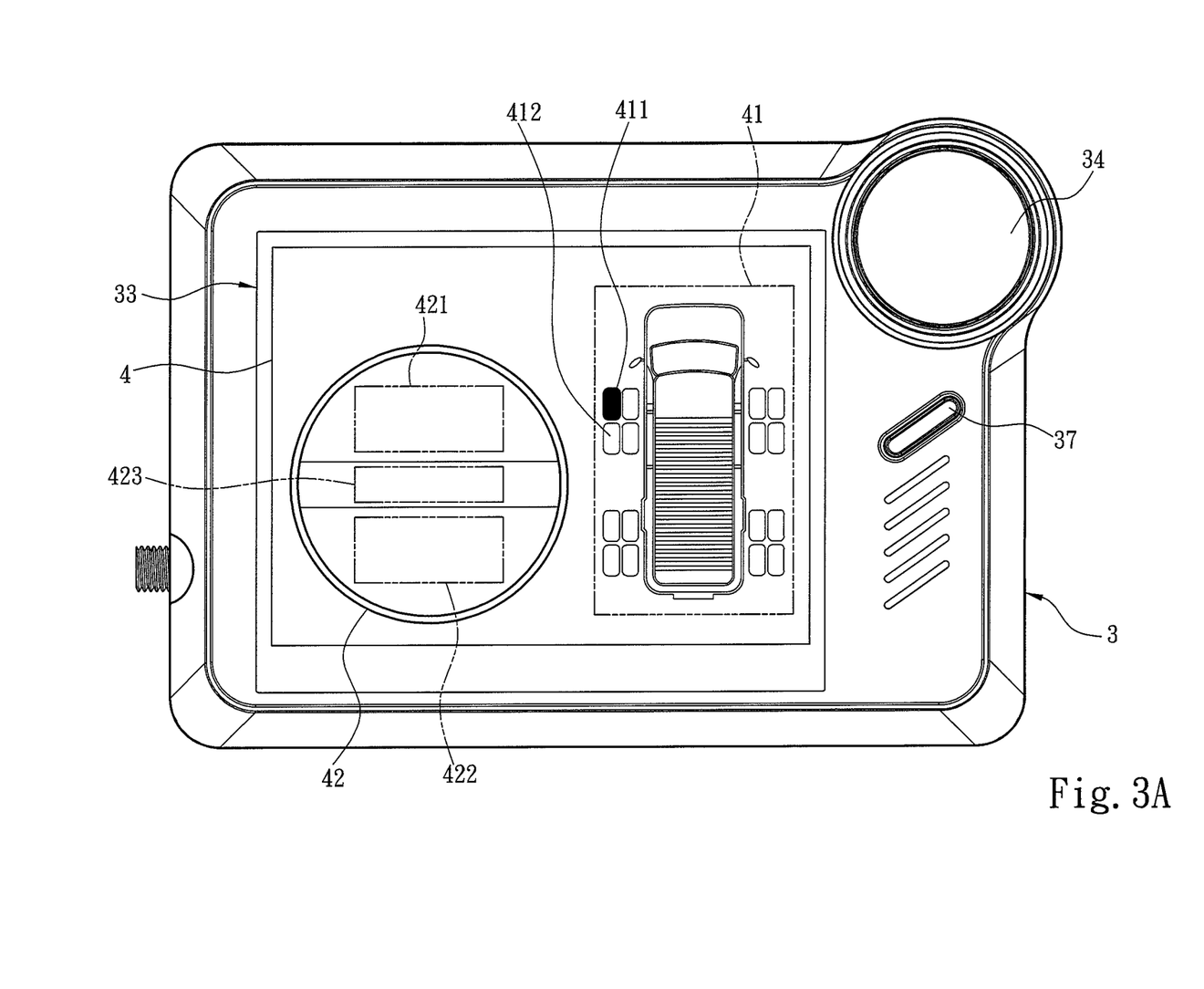
FIG. 3A and FIG. 3B are schematic diagrams according to embodiments of the present invention.
Figure 3B:
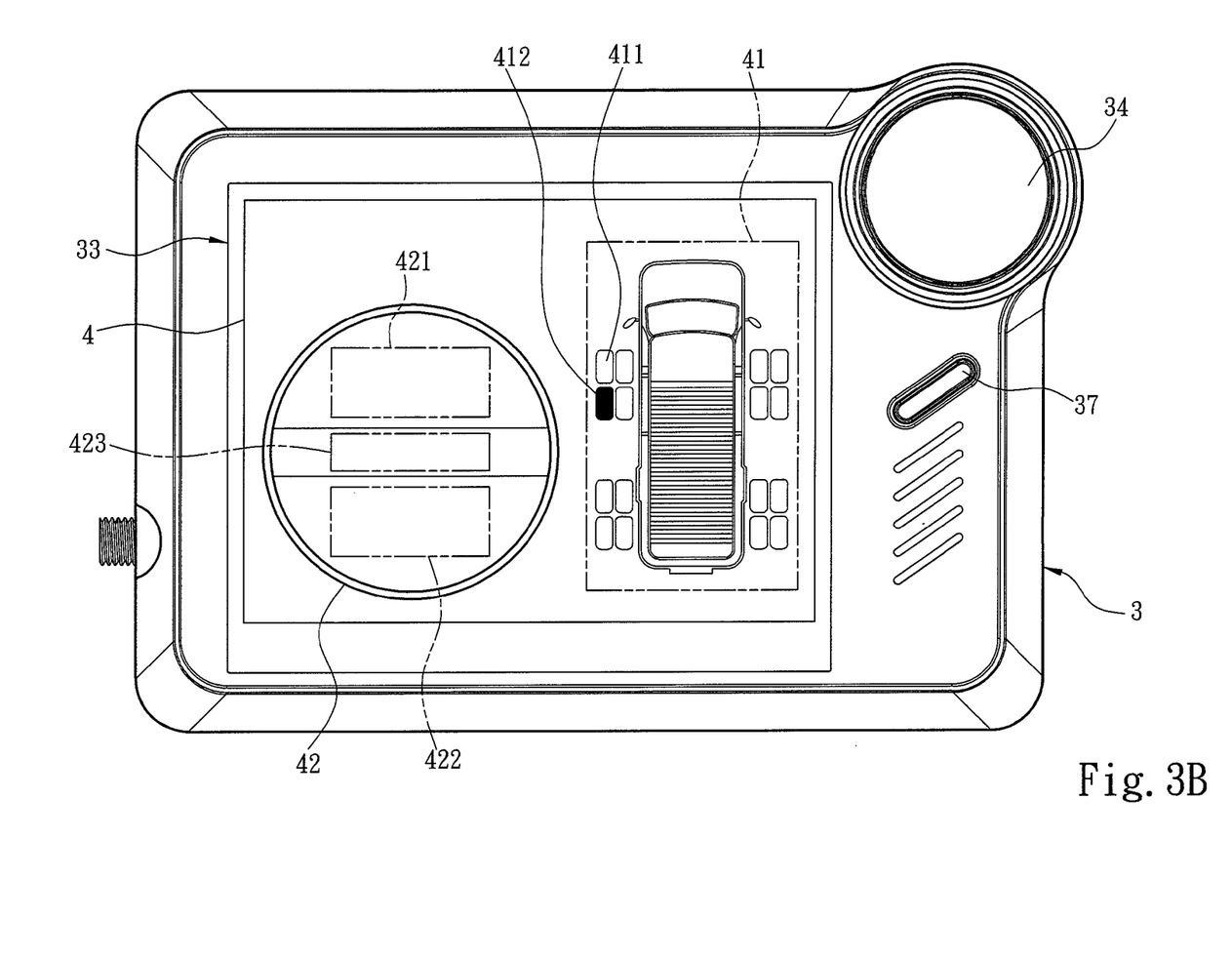

Referring to FIG. 1, FIG. 2 and FIG. 3, as shown, a tire pressure monitoring system 1 is provided by the present invention. The tire pressure monitoring system 1 is formed by a plurality of tire pressure sensing modules 2 and an information display module 3. More specifically, each of the tire pressure sensing modules 2 is correspondingly installed on one of the tires of a vehicle, and the number of the tire pressure sensing modules 2 can be modified according to the number of the tires of the vehicle. In the present invention, an example of a large vehicle having 16 tires is given, and the tire pressure sensing modules 2 are respectively installed on each of the 16 tires. In the present invention, to clearly correspond to a tire pressure condition generated by each of the tires, each tire pressure sensing module 2 has a device identification code D1. In the present invention, the tire pressure sensing module 2 may be implemented in two forms an internal tire pressure sensor and an external tire pressure sensor. In both of the implementation forms, each tire pressure sensor 2 includes a detection unit 21 and a first data transmission unit 22. The detection unit 21 constantly detects an in-tire condition of the corresponding tire assembled, and outputs a set of tire condition information D2. The tire condition information D2 may be an internal tire pressure or an internal tire temperature. Further, instead of detecting the internal tire condition only for a traveling vehicle, the detection unit 21 of the present invention may also detect the internal tire condition when the vehicle is at standstill. The first data transmission unit 22 constantly receives the tire condition information D2 from the detection unit 21 and sends the same to the information display module 3. Further, in addition to the tire condition information D2, the first data transmission unit 22 of the present invention also at the same time transmits the device identification code D1 representing the corresponding tire pressure sensing module 2.

Again referring to FIG. 2, the information display module 3 is in information connection with every of the tire pressure sensing modules 2, and includes a second data transmission unit 31, a data processing unit 32, a display unit 33, and a stepless knob 34. The second data transmission unit 31 is in information connection with the first data transmission units 22 of the tire pressure sensing modules 2, and receives the tire condition D2 outputted from the first data transmission units 22. Data transmission between the second data transmission unit 31 and the first data transmission units 22 may be performed through wired or wireless transmission, e.g., wireless transmission based on the Bluetooth communication protocol.

The data processing unit 32 is electrically connected to the second data transmission unit 31, and obtains the device identification codes D1 and the tire condition information D2 outputted by the first data transmission units 22 from the second data transmission unit 31. Further, the data processing unit 32 may respectively associate a plurality of preset device selection codes in the data processing unit 32 with the device identification codes D1. In continuation of the above example, as 16 tire pressure sensing modules 2 are installed at the vehicle, the second data transmission unit 31 receives 16 device identification codes D1 in different values. The data processing unit 32 respectively associates the device identification codes D1 with the preset device selection codes. That is to say, each of the device selection codes corresponds to only one of the device identification codes D1. The display unit 33 is electrically connected to the data processing unit 32, and receives and displays the tire condition information D2 from the data processing unit 32. In one embodiment of the present invention, when powered, the display unit 33 further displays a graphics interface 4. The graphics interface 4 includes a tire position display block 41 and a tire information display block 42. The tire position display block 41 displays a vehicle image and a plurality of tire images, which represent a current corresponding configuration of the vehicle. Positions where the tire images are configured respectively represent actual positions of the tires of the vehicle, and each tire image corresponds to one of the device selection codes. Further, displayed images in the tire position display block 41 can be displayed by an image that is adjustable according to the different vehicles, and may emphasize a corresponding tire image according to a user selection. The tire information display block 42 includes a tire pressure display field 421, a tire temperature display field 422, and a warning signal display field 423. The tire pressure display field 421 displays internal tire pressure values included in the tire condition information D2. The tire temperature display field 422 displays internal tire pressure values included in the tire condition information D2. The warning signal display field 423 warns a driver that the tire condition information D2 received by the information display module 3 exceeds a comparison reference value preset in the data processing unit 32.

In the present invention, the stepless knob 34 is electrically connected to the data processing unit 32, and is operable by a user by a control means to generate at least one selection signal. The control means differs according to implementation methods of the stepless knob 34. For example, when the stepless knob 34 is operated by turning, the control means is a motion that turns the stepless knob 34. After generating the selection signal, the stepless knob 34 outputs the selection signal to the data processing unit 32 to enable the data processing unit 32 to identify the device selection code represented by the selection signal. Further, electrical characteristics of one selection signal generated by the stepless knob 34 of the present invention may be designed to be different from those of another. For example, the selection signals may be distinguished according to differences in voltage values. More specifically, in one embodiment, the selection signal may further include a rotary encoder (not shown). The rotary encoder determines and converts a rotation amount generated from an operation or a rotated position after the operation to the selection signal. The rotary encoder may have four contact points each having a conducted state and a cut-off state, and is rotatable for 360 degrees. According to positions of the four contact points and the rotatable angles of the rotary encoder, the rotary encoder defines a plurality of working intervals. Pin statuses of the working intervals are different to accordingly generate the selection signals having a plurality of different electrical characteristics. Further, in one embodiment, the data processing unit 32 further includes a data storage unit 35 connected to the data processing unit 32. The data storage unit 35 may be a flash memory or an electrically erasable programmable read-only memory (EEPROM), and is for the data processing unit 32 to write data therein or read data therefrom. The information display module 3 of the present invention may further include a third data transmission unit 36, which is electrically connected to the data processing unit 32 to be in information connection with an external device. By electrically connecting the third data transmission unit 36 to the data processing unit 32 via an electrical wire, the third data transmission unit 36 allows a driver to update firmware in or access data from the data processing unit 32. For example, the third data transmission unit 36 is a Universal Serial Bus (USB) or a Universal Asynchronous Receiver/Transmitter (UART).

Again referring to FIG. 3A as well as FIG. 3B, to more clearly describe details of an application process of the present invention, it is assumed that a driver has already selected the information display module 3 to display a tire condition corresponding to an outer front left tire of a vehicle. The tire position display block 41 in the graphics interface 4 generated by the powered display unit 33 displays in emphasis the tire image corresponding to the outer front left tire, as shown by 411 in FIG. 3A. The tire pressure display field 421 and the tire temperature display field 422 in the tire information display block 42 respectively show the internal tire pressure value and the internal tire temperature value of the outer front left tire. When the driver later wishes to check the tire condition of the outer front left tire, the stepless knob 34 may be operated to have the stepless knob 34 generate the selection signal. The data processing unit 32 then receives the selection signal, and analyzes the selection signal to identify the corresponding device selection code. When it is discovered that the selection signal corresponds to the device selection code of the other outer front left tire, the data processing unit 32 reads the corresponding device identification code D1 and tire condition information D2 according to the device selection code, and adjusts the tire image displayed in emphasis in the tire position display block 41 according to the device selection code, as shown by 412 in FIG. 3B. Meanwhile, the data processing unit 32 reads the tire condition information D2 corresponding to the other outer front left tire according to the device selection code and outputs the tire condition information D2 to the display unit 33 for display. The tire pressure display field 421 and the tire temperature display field 422 display the internal tire pressure value and the internal tire temperature value corresponding to the other outer front left tire, respectively.

Figure 4:
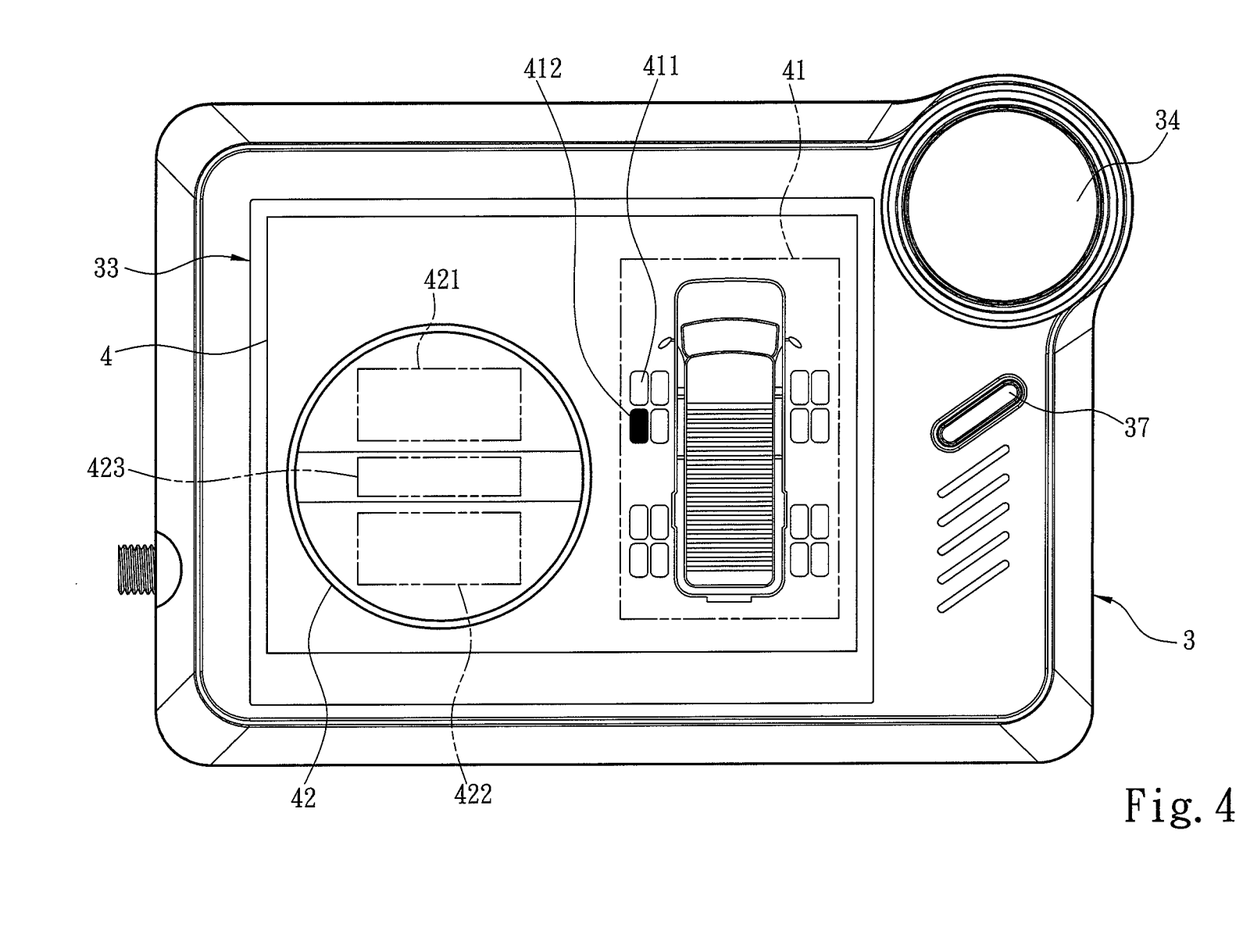
FIG. 4 is a schematic diagram of an abnormality warning mode according to an embodiment of the present invention.

Again referring to FIG. 1, in one embodiment of the present invention, the information display module 3 further includes a setting member 37 electrically connected to the data processing unit 32. The setting member 37 may be implemented in various forms, e.g., a button or a micro switch. When the setting member 37 is triggered by a user, the data processing unit 32 is prompted to enter a task mode preset in the data processing unit 32. The task mode varies according to different application requirements. Referring to FIG. 4, in one embodiment, the task mode may be an abnormality warning mode, in which the data processing unit 32 has an abnormal condition preset in the data processing unit 32. More specifically, the abnormal condition may be a comparison reference value, which may represent a threshold that the tire condition approaches to be abnormal or the tire condition is within a normal range. In the abnormality warning mode, the data processing unit 32 constantly compares every set of tire condition information D2 received, and outputs a warning signal to the display unit 33 once the set of tire condition information D2 received satisfies the comparison reference value that serves a limitation in the abnormal condition. The display unit 33 displays the warning signal in the warning signal display field 423, which may inform in emphasis the driver about the abnormality of the vehicle tire. In the abnormality warning mode, instead of comparing the tire condition information D2 of one of the tires that is currently displayed, the data processing unit 32 at the same time compares the tire condition information D2 of all the tires of the vehicle. Once the tire condition information D2 of one of the tires satisfies the abnormal condition, the data processing unit 32 outputs the device selection code and the tire condition information D2 corresponding to the abnormality to the display unit 33 to issue a warning.

To allow a driver to adjust the abnormal condition according to conditions of a vehicle, in one embodiment, the preset task mode in the data processing unit 32 may be an abnormal condition setting mode. In the abnormal condition setting mode, the data processing unit 32 receives the selection signal outputted by the stepless knob 34, and determines the comparison reference value as the abnormal condition for comparing the tire condition information D2 according to the selection signal. Further, the driver may select to enter the abnormal condition setting mode through the setting member 37 and operate the stepless knob 34 to generate the selection signal. The data processing unit 32 correspondingly determines the selection signal as adjusting amplitude of the comparison reference value. For example, the comparison reference value is increased when the stepless knob 34 is turned towards a first direction and decreased when the stepless knob 34 is turned towards a second direction.

Figure 5:
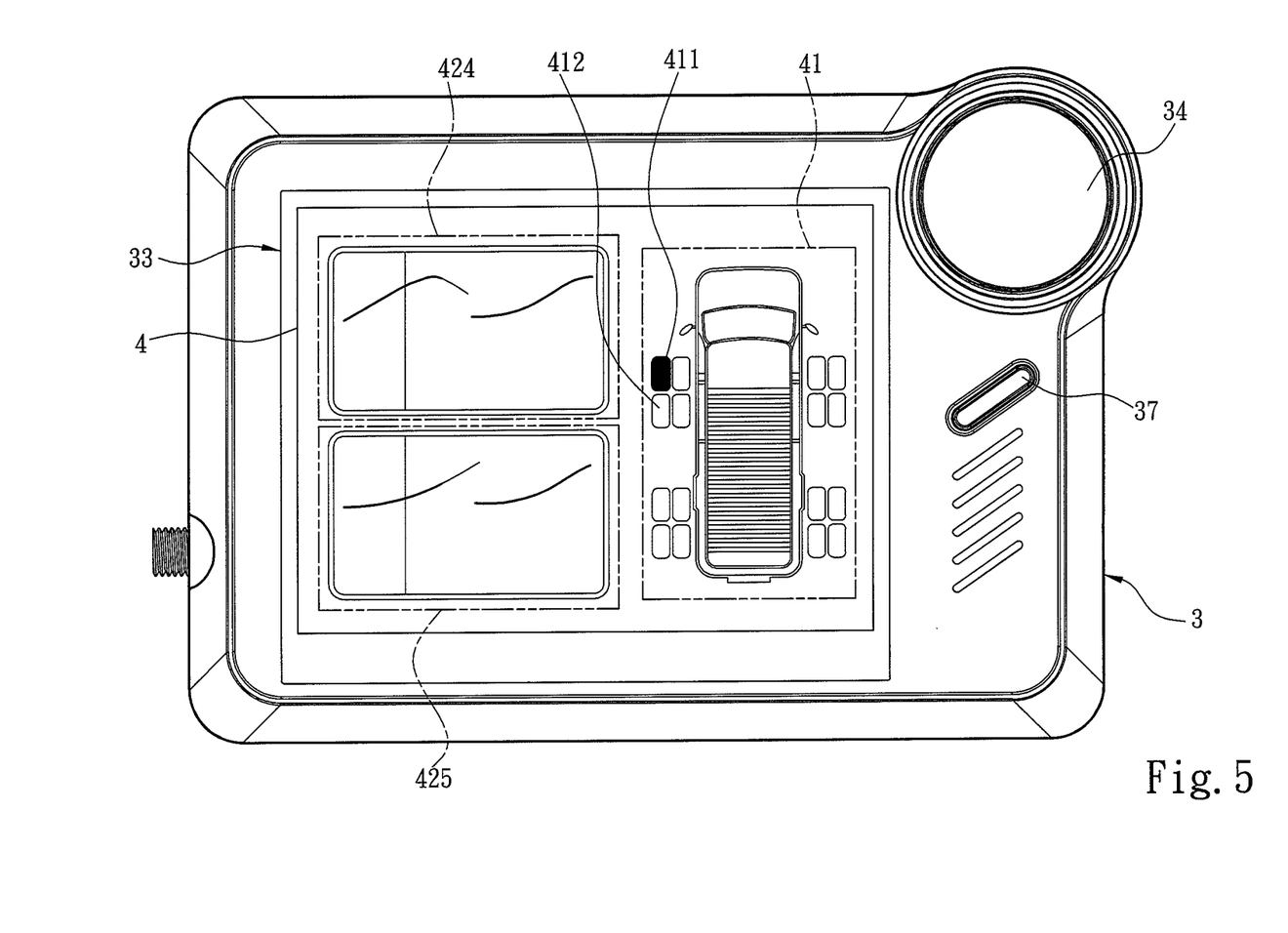
FIG. 5 is a schematic diagram of a data graphicalization mode according to an embodiment of the present invention.
Figure 6:
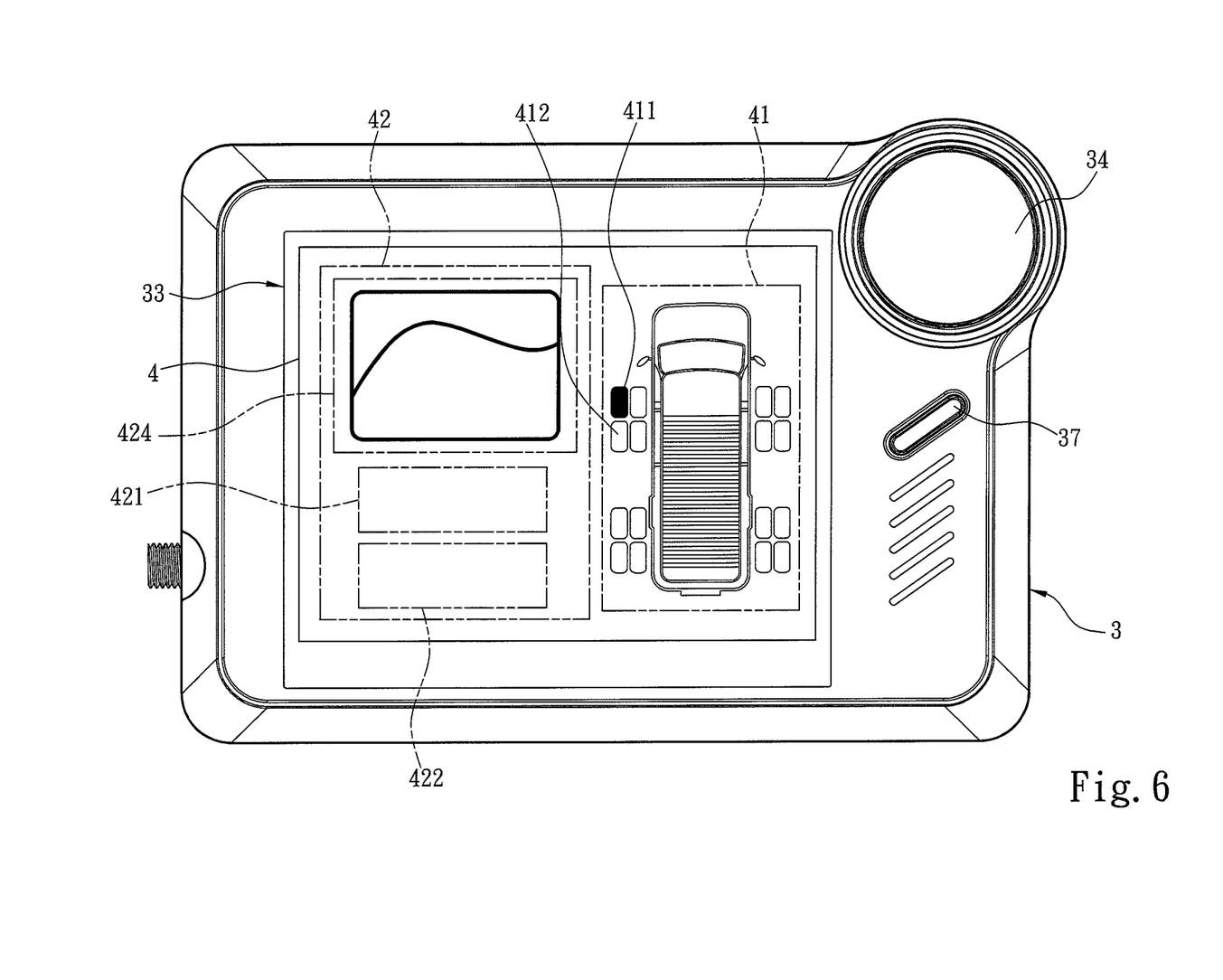
FIG. 6 is a schematic diagram of a data graphicalization mode according to an embodiment of the present invention.

Referring to FIG. 5 and FIG. 6, in addition to the above embodiments, to provide a driver with changes in all tires of a travelling vehicle, in one embodiment of the present invention, the preset task mode in the data processing unit 32 may be a data graphicalization mode. In the data graphicalization mode, the data processing unit 32 processes one set of the tire condition information D2 corresponding to one of the device identification codes D1 within a monitoring period, and converts the tire condition information D2 to a set of tire pressure simulation graphic data. More specifically, in the embodiment, the driver may select to enter the data graphicalization mode by triggering the setting member 37. Upon entering the data graphicalization mode, the driver may set length of the monitoring period and the tire to be monitored, and generate the device selection code of the tire to be monitored through the stepless knob 34 to access the tire condition information D2 to the device selection code. After quantizing all the tire condition information D2 within the monitoring period, the tire pressure simulation graphic data is completed and outputted to the display unit 33, and displayed in the tire information display block 42 of the graphics interface 4. It is known from the above description that, the tire condition information D2 may include the internal tire pressure or the internal tire temperature. Thus, in one embodiment, the tire information display block 42 in the data graphicalization mode includes a tire pressure graphics display field 424 and a tire temperature graphics display field 425. It should be noted that the tire pressure simulation graphic data of the present invention is not limited to a curve diagram shown in FIG. 5. Further, the in the data graphicalization mode, the data processing unit 32 further includes flag data in the tire pressure simulation graphic data. The flag data may be controlled by the selection signal outputted by the stepless knob 34. More specifically, a position of the flag data marked in the tire pressure simulation graphic data is changed by an operation of the driver. In simple, the flag data indicates a time point of the tire pressure simulation graphic data, and the driver may change the time point that the flag data indicates in the tire pressure simulation graphic data through operating the stepless knob 34. Further, in the data graphicalization mode, the data processing unit 32 further compares the abnormal condition with each set of the tire condition information D2 during the conversion process of the tire pressure simulation graphic data. When any set of the tire condition information D2 satisfies the abnormal condition, the set of tire condition information D2 satisfying the abnormal condition is indicated in emphasis in the tire pressure simulation graphic data.

Referring to FIG. 6, in one embodiment, the preset task mode in the data processing unit 32 is a tire condition polling mode. In the tire condition polling mode, the data processing unit 32 sequentially reads the device selection codes at a time interval, and outputs the tire condition information D2 corresponding to the device selection codes to the display unit 33 to display the tire condition information D2 in the graphics interface 4. Again referring to FIG. 3A and FIG. 3B, it is assumed that the information display module 3 displays the tire condition information corresponding to the outer front left tire at the time when entering the tire condition polling mode. After the time interval, the data processing unit 32 reads the device selection code corresponding to the other outer front left tire, and outputs the tire condition information D2 corresponding to the other outer front left tire, as shown in FIG. 3B. After another time interval, the data processing unit 32 reads another device selection code corresponding to another tire. Such process is continued cyclically.

In another embodiment of the present invention, the preset task mode in the data processing unit 32 may be a tire parameter setting mode. In the tire parameter setting mode, the data processing unit 32 receives the selection signal to determine a parameter of the tire. More specifically, a driver may operate the stepless knob 34 to output the selection signal to the data processing unit 32, which then analyzes the selection signal to adjust the parameter of the tire preset in the data processing unit 32. More specifically, in the present invention, the parameter may be a tire sectional width, a tire flat ratio, a rim index or a tire load index. Before setting the tire parameter, the driver needs to select the parameter to be adjusted and then operate the stepless knob 34 to generate the selection signal for the adjustment. Thus, according to different tire manufacturer brands and models, the driver is allowed to correspondingly adjust the tire parameter so that the tire condition information D2 generated can more practically satisfy real situations.

As described in the foregoing embodiments of the present invention, transmission between the tire pressure sensing modules 2 and the information display module 3 may be implemented by wireless transmission. Therefore, in one embodiment, the preset task mode in the data processing unit 32 may be a tire pressure sensing module matching mode. In the tire pressure sensor matching mode, the data processing unit 32 prompts the second data transmission unit 31 to search for the device identification code D1 of any tire pressure sensing module 2 detectable within a connection distance, and determines whether the detected device identification code D1 has been associated with any of the device selection codes. If the detected device identification code D1 has not yet been associated with any of the device selection codes, it means that the second data transmission unit 31 is not connected to the tire pressure sensing module 2 with the detected device identification code D1. The driver may further operate the stepless knob 34 to output the selection signal to appoint one of the device selection codes to associate with the tire pressure sensing module 2, and to have the second data transmission unit 31 to constantly electrically connect to the first data transmission unit 22 of the tire pressure sensing module 2 that is not yet matched to complete the matching procedure. As such, in the event that one tire pressure sensing module 2 malfunctions, the malfunctioning tire pressure sensing module 2 may be replaced by another tire pressure sensing module 2 that is then similarly connected to the information display module 3.

Figure 7:
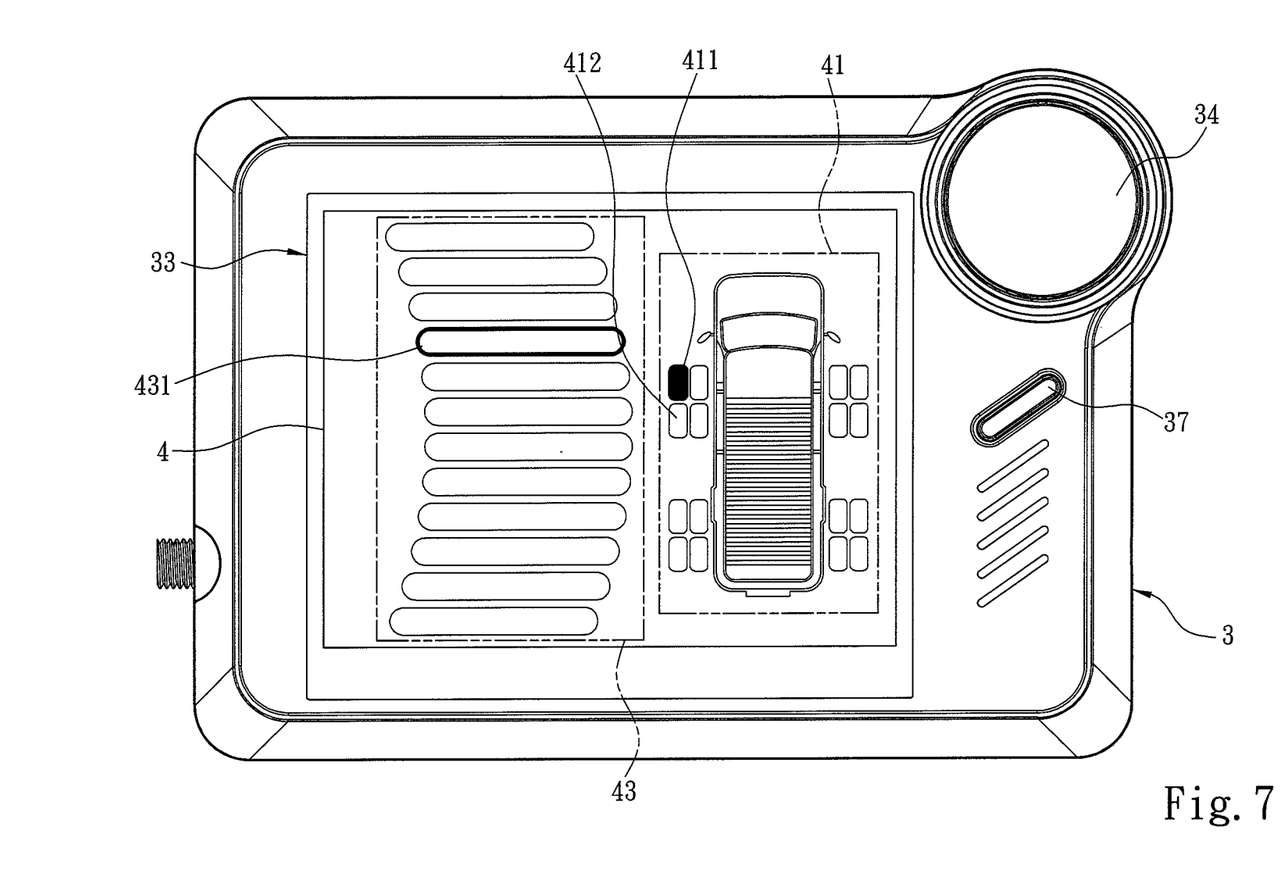
FIG. 7 is a schematic diagram of a menu mode according to an embodiment of the present invention.

Referring to FIG. 7, the preset task mode in the data processing unit 32 may be a menu mode. The menu mode allows a driver to enter any of the above task modes. More specifically, in the menu mode, the graphics interface 4 includes a menu block 43, which includes a plurality of options 431 each representing a task mode, e.g., the abnormal condition setting mode, the data graphicalization mode, or the tire parameter setting mode. In practice, the driver may select to enter the menu mode by triggering the setting member 37, and operate the stepless knob 34 to generate the selection signal to the data processing unit 32. The data processing unit 32 further analyzes the selection signal and selects one of the options 431, so as to prompt the data processing unit 32 to enter the corresponding task mode represented by the selected option 431.

In conclusion, the tire pressure monitoring system of the present invention includes a plurality of tire pressure sensing modules and an information display module in information connection with the tire pressure sensing modules. The tire pressure sensing modules are respectively installed to tires of a vehicle, and transmit the tire condition information D2 and device identification codes D2 of the respective tires to the information display module. The information display module includes a data processing unit and a stepless knob. The data processing unit associates each of the device identification codes D1 with a device selection code. The stepless knob is controlled to output at least one selection signal to the data processing unit. Upon receiving the selection signal, the data processing unit identifies the device selection code corresponding to the selection signal and reads the corresponding tire condition information D2, thereby allowing a user to quickly learn the tire condition of any tire of the vehicle according to requirements. In one embodiment, the display unit displays a tire pressure change of a selected tire within a monitoring period, so that a driver may observe a time point that is liable to an abnormality of the tire pressure during a driving process. As such, repeated accidents caused by abnormal tires can be effectively prevented.

What is claimed is:

1. A tire pressure monitoring system, comprising:
   a plurality of tire pressure sensing modules, installed on tires of a vehicle respectively, each of the tire pressure sensing modules having a device identification code and comprising:
     a detection unit, configured to constantly detect a tire condition of the tire and to output a set of tire condition information; and a first data transmission unit, in information connection with the detection unit to transmit the tire condition information and the device identification code; and an information display module, in information connection with the plurality of tire pressure sensing modules, comprising:

a second data transmission unit, connected to the first data transmission units to receive the device identification codes and the tire condition information of the plurality of tire pressure sensing modules;

a data processing unit, configured to obtain the device identification codes and the tire condition information from the second data transmission unit, and to associate each of the device identification codes with a device selection code;

a display unit, in information connection with the data processing unit, configured to display the tire condition information obtained from the data processing unit;

a stepless knob, in information connection with the data processing unit, configured to output at least one selection signal to the data processing unit by a control means; and a setting member, connected to the data processing unit, configured to prompt the data processing unit to enter one of a plurality of task modes preset in the data processing unit when triggered by a user, wherein the selection signal is associated with the device selection code; the corresponding tire condition information is read according to the corresponding device selection code when the data processing unit receives the selection signal, and is outputted to the display unit for display, wherein the plurality of task modes includes a data graphicalization mode; in the data graphicalization mode, the data processing unit processes one set of the tire condition information corresponding to one of the device identification codes within a monitoring period to convert the tire condition information to a set of tire pressure simulation graphic data to be displayed at the display unit, and wherein the data processing unit includes flag data in the set of tire pressure simulation graphic data which indicates a time point of the tire pressure simulation graphic data, and the time point that the flag data indicates in the tire pressure simulation graphic data is changed by the selection signal outputted by stepless knob.

2. The tire pressure monitoring system of claim 1, wherein the information display module further comprises:

a data storage unit, in information connection with the data processing unit, configured to store the device identification codes and the tire condition information.

3. The tire pressure monitoring system of claim 2, wherein the information display module further comprises:

a setting member, connected to the data processing unit, configured to prompt the data processing unit to enter a task mode preset in the data processing unit when triggered by a user.

4. The tire pressure monitoring system of claim 1, wherein the task mode is an abnormality warning mode; in the abnormality warning mode the data processing unit includes an abnormal condition preset in data processing unit, and compares each set of tire condition information with the abnormal condition, and outputs a warning signal to the display unit for display when any set of tire condition information satisfies the abnormal condition.

5. The tire pressure monitoring system of claim 1, wherein the task mode is an abnormal condition setting mode; in the abnormal condition setting mode the data processing unit receives the selection signal outputted by the stepless knob to determine an abnormal condition serving as a comparison reference value for comparing with the tire condition information.

6. The tire pressure monitoring system of claim 1, wherein the task mode is a tire condition polling mode; in the tire condition polling mode the data processing unit sequentially reads the device selection codes at a time interval to read and output the corresponding tire condition information to the display unit for display.

7. The tire pressure monitoring system of claim 1, wherein the task mode is a tire parameter setting mode; in the tire parameter setting mode the data processing unit determines a tire parameter of the tires of the vehicle according to the selection signal outputted by the stepless knob.

8. The tire pressure monitoring system of claim 1, wherein the task mode is a tire pressure sensing module matching mode; in the tire pressure sensing module matching mode the data processing unit prompts the second data transmission unit to search any device identification code detectable within a connection distance, determines whether the detected device identification code has been previously obtained, and connects to the tire pressure sensing module corresponding to the detected device identification code according to the detected device identification code and the current selection signal generated by the stepless knob when the detected device identification code has not been previously obtained.

* * * * *